United States Patent
Chasko (12)

(10) Patent No.: US 6,738,749 B1
(45) Date of Patent: May 18, 2004

(54) METHODS AND APPARATUS FOR CREATING AND STORING SECURE CUSTOMER RECEIPTS ON SMART CARDS

(75) Inventor: Stephen J. Chasko, Flowery Branch, GA (US)

(73) Assignee: NCR Corporation, Dayton, OH (US)

( * ) Notice: Subject to any disclaimer, the term of this patent is extended or adjusted under 35 U.S.C. 154(b) by 708 days.

(21) Appl. No.: 09/149,917

(22) Filed: Sep. 9, 1998

(51) Int. Cl.[7] .............................................. G06F 17/60
(52) U.S. Cl. ............................ 705/17; 705/16; 705/41; 705/44
(58) Field of Search ........................ 705/17, 16, 41–44

(56) References Cited

U.S. PATENT DOCUMENTS

| | | | |
|---|---|---|---|
| 4,220,991 A | | 9/1980 | Hamano et al. ............. 364/405 |
| 4,328,544 A | | 5/1982 | Baldwin et al. ............. 364/405 |
| 4,594,663 A | | 6/1986 | Nagata et al. ............... 364/401 |
| 4,798,322 A | | 1/1989 | Bernstein et al. ........... 235/487 |
| 5,036,461 A | * | 7/1991 | Elliott et al. ............... 364/408 |
| 5,256,863 A | * | 10/1993 | Ferguson et al. ........... 235/383 |
| 5,297,202 A | * | 3/1994 | Kapp et al. ..................... 380/9 |
| 5,401,946 A | | 3/1995 | Weinblatt .................... 235/381 |
| 5,482,139 A | | 1/1996 | Rivalto ......................... 186/36 |
| 5,559,313 A | * | 9/1996 | Claus et al. ................. 235/380 |
| 5,577,121 A | * | 11/1996 | Davis et al. .................... 380/24 |
| 5,644,723 A | | 7/1997 | Deaton et al. .............. 395/214 |
| 5,659,166 A | | 8/1997 | Mori et al. .................. 235/380 |
| 5,665,953 A | | 9/1997 | Mazzamuto et al. ........ 235/383 |
| 5,671,279 A | * | 9/1997 | Elgamal ....................... 380/23 |
| 5,739,512 A | * | 4/1998 | Tognazzini .................. 235/380 |
| 5,748,908 A | * | 5/1998 | Yu ............................... 395/244 |
| 5,754,655 A | * | 5/1998 | Hughes et al. ................. 380/24 |
| 5,923,759 A | * | 7/1999 | Lee .............................. 380/25 |
| 5,987,140 A | * | 11/1999 | Rowney et al. ............... 380/49 |
| 5,991,412 A | * | 11/1999 | Wissenburgh et al. ........ 380/24 |
| 6,085,976 A | * | 7/2000 | Sehr ........................... 235/384 |
| 6,131,090 A | * | 10/2000 | Basso, Jr. et al. ............. 706/23 |
| 6,142,369 A | * | 11/2000 | Jonstromer ................. 235/380 |

FOREIGN PATENT DOCUMENTS

| | | | | |
|---|---|---|---|---|
| WO | WO-9805011 A2 | * | 2/1998 | ........... G07F/19/00 |
| WO | WO-9837675 A1 | * | 8/1998 | ........... H04L/29/06 |

OTHER PUBLICATIONS

"Cybercash as a Virtual Smart Card," Electronics Payments International, Aug. 1995, n99, 3 pages.*

* cited by examiner

Primary Examiner—Marc Norman
(74) Attorney, Agent, or Firm—Paul W. Martin; Priest & Goldstein, PLLC

(57) ABSTRACT

A system for creating, storing and retrieving secure transaction receipts. These transaction receipts may be stored on portable electronic media that can be carried by a consumer. Each transaction record contains information detailing the product or service purchased as well as a merchant ID and a customer (or other user) ID and an encrypted signature created from that data. The data can be further protected by the use of an optional user password. Examples of suitable portable storage media are personal computer diskettes, magnetic stripe cards or smart cards. The secure electronic transaction receipts may be used as substitutes for paper receipts. The portable electronic media is capable of storing a large plurality of such transaction records, thus simplifying a number of record keeping procedures, such as expense reporting and data entry for personal finance programs.

22 Claims, 14 Drawing Sheets

| MERCHANT ID | 601 |
| --- | --- |
| CUSTOMER ID | 611 |
| TRANSACTION DATE | 620 |
| TRANSACTION TIME | 630 |
| ITEM #1 PRICE | 670 |
| ITEM #1 DESCRIPTION | 671 |
| ITEM #1 UPC, EAN, ETC. | 672 |
| ITEM #2 PRICE | 673 |
| ITEM #2 DESCRIPTION | 674 |
| ITEM #2 UPC, EAN, ETC. | 675 |
| ITEM #n PRICE | |
| ITEM #n DESCRIPTION | |
| ITEM #n UPC, EAN, ETC. | |
| TRANSACTION TOTAL | 640 |
| TENDER TYPE | 641 |
| MERCHANT SIGNATURE | 650 |
| OPTIONAL CUSTOMER SIGNATURE | 660 |

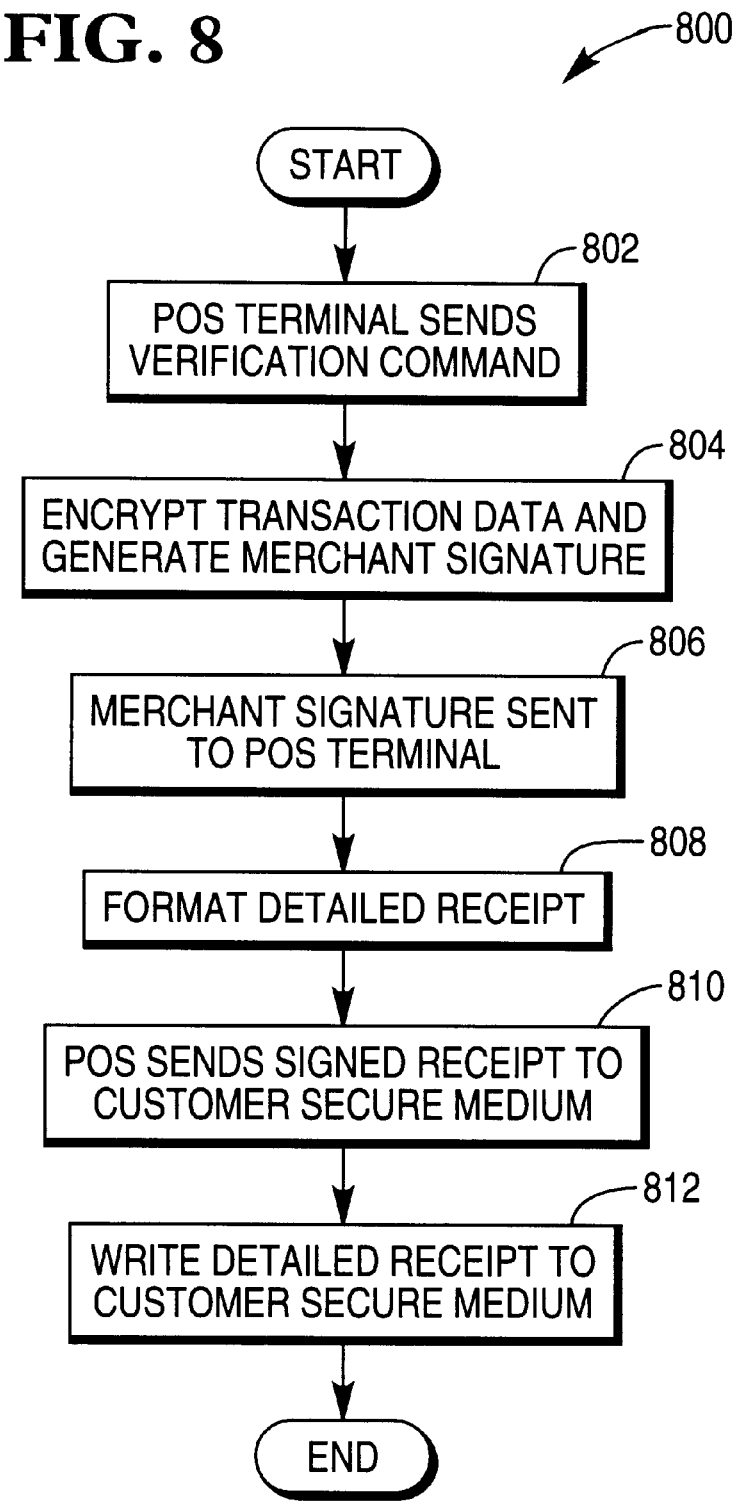

METHODS AND APPARATUS FOR CREATING AND STORING SECURE CUSTOMER RECEIPTS ON SMART CARDS

FIELD OF THE INVENTION

The present invention relates generally to improvements in the creation, storage and utilization of various types of transaction data including business, travel expense data, retail customer receipt data, and the like. In particular, the invention relates to advantageous methods and apparatus for processing various transactions, incorporating merchant authentication or signature data into certain individual transactions, storing these transactions securely on removable media and allowing access to the transactions by various entities including retail customers and retail merchants.

BACKGROUND OF THE INVENTION

The processing of most retail transactions is accomplished utilizing some type of computerized system. A typical retail transaction in a store, hotel, restaurant or at an airline counter involves a Point-of-Sale (POS) system comprised of one or more POS terminals, a POS system controller and other related devices. At the completion of the typical transaction, the customer tenders payment and receives some type of transaction confirmation, such as a paper receipt.

A typical consumer will purchase goods and services from numerous merchants throughout a given period of time. The transaction processes for all of these purchases are quite similar although the nature of the merchant and the purchase may vary considerably. One feature common to these different transactions is the need for the consumer to retain their paper receipts for any returns they may wish to make later. The procedure for processing returns varies among retailers. Some retailers still rely upon the authenticity of the paper receipt alone, but most retain the transaction data electronically for some period of time. This transaction data is typically transmitted to a remote database at a company's headquarters overnight, although some retailers utilize a trickle transmit system to send the data in near real-time. The data may be retained in the store where it originated for a period of months, and indefinitely at the central database. When a customer presents an item for return to the store of original purchase, the retailer will typically attempt to verify the validity of the receipt by finding the transaction on the POS system. If this procedure fails, the system will look for the transaction data in the central database. If both systems are unavailable, the retailer may accept the paper receipt as long as the receipt appears to be valid (i.e. proper paper stock, proper format, etc.), alternately issue a merchandise credit, or deny the return outright. This process can be time consuming for both the retailer and the consumer. The retailer may be exposed to fraud when the POS transaction data is unavailable or corrupted, and the return process can result in customer dissatisfaction. Customers are burdened with the need to retain paper receipts in good condition until they are sure that they will not return purchases. The problem to be solved, therefore, is to eliminate the need for paper receipts by providing a secure means of storing and accessing the transaction data for both the retailer and the customer.

A related problem exists for the consumer that wants to keep track of his or her expenses utilizing a personal computer and an appropriate personal finance application program. A typical program requires the consumer to periodically enter data manually into the personal computer to ensure that the expenses are properly recorded and categorized. Unfortunately, the information provided by a paper receipt is often inadequate for properly entering this information. Depending on the merchant, the printed receipt may use highly abbreviated descriptions due to the constraints of the paper stock and receipt printer. Also, the problem is compounded when a consumer shops in a multiple-format store. For example, a single physical store location may sell groceries as well as hardgoods and clothing. This requires the consumer to understand the printed description well enough to know which category an individual purchase item should be assigned to. The problem to be solved therefore, is to be able to minimize the amount of manual data entry and interpretation required to efficiently use a personal finance program.

A related problem involves the processing steps required to track business travel expenses, and the steps required to submit travel expense accounts to an employer. For example, in the course of even a brief trip, a business traveler may pay for an airline ticket at a ticket counter, a magazine at a kiosk, a rental car at a rental counter, a meal in a restaurant and check into a hotel for overnight lodging. At the end of the trip, the traveler may have accumulated a significant number of paper receipts in various formats. These receipts must then be submitted to the company's expense accounting department for reimbursement of those expenses that are valid business expenses. The traveler usually bears the burden of keeping track of those receipts during the trip. He must then sort and copy those receipts related to business expenses, and then submit them with an expense account form for reimbursement. The expense accounting department must then review the expense account form and the receipts for accuracy before processing the traveler's reimbursement. This largely manual process is tedious and time consuming for both the traveler and the expense accounting department. The problem to be solved, therefore, is to provide a means of automating this manual process and to increase the accuracy of the resulting reimbursement.

There exists, then, a need in a wide variety of contexts for a system that allows for the creation and storage of secure transaction data. Such a system should allow individuals to consolidate transaction data from various sources into a single portable, secure medium. The system should also allow merchants to create the transaction records they desire, and to store such records by a secure means. The portable medium needs to be able to accept data from various merchants with some means of authentication, while providing the media holder with an acceptable data security.

SUMMARY OF THE INVENTION

A transaction data system according to one aspect of the present invention preferably includes a mechanism for a merchant to write transaction data to a portable medium such as a magnetic stripe or a smart card. The transaction data includes information that describes the purchased goods and services as well as information that identifies the merchant and the consumer. The sum of these elements comprises a complete record of an individual retail transaction. The transaction data is preferably authenticated by including a unique signature for each complete transaction sequence. The signature is generated by encrypting the various elements of transaction data from an individual retail transaction. The resulting record of the transaction data is also written to the merchant's POS system or other transaction system. The portable medium is carried by the consumer and can be read by a suitable device attached to a merchant's POS system, as well as a similar device attached to a personal computer. The holder of the medium may secure the stored data to prevent unauthorized users from reading such data by assigning password protection to all data stored on the medium, or to individual transactions.

The following Detailed Description and accompanying drawings will provide a more complete understanding of the present invention as well as describing further features and advantages of the invention.

BRIEF DESCRIPTION OF THE DRAWINGS

FIG. 6 illustrates a detailed transaction record in accordance with one aspect of the present invention;

FIG. 8 illustrates a method for generating a merchant signature in accordance with the present invention;

DETAILED DESCRIPTION

The present invention provides a system for generating authenticated electronic retail transaction receipts and storing them on a secure, portable medium. A retail transaction receipt, or record, may be suitably comprised of, but is not limited to, certain data elements such as the time and date of the transaction, the price and description of the items or services purchased, a retail merchant identifier, a customer identifier and a merchant signature.

Figure 1:
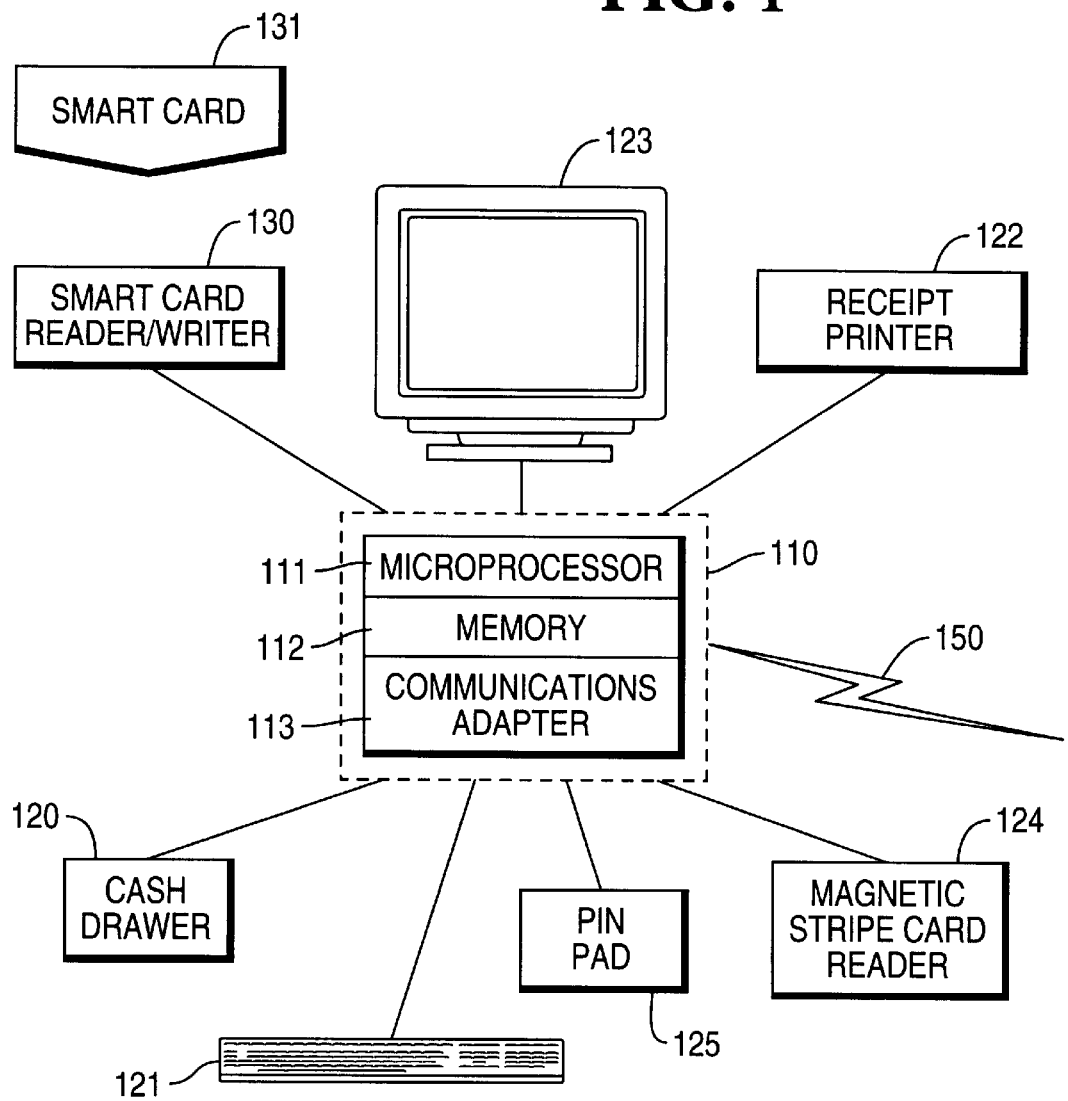
FIG. 1 illustrates a POS terminal including a smart card reader/writer for use with the present invention.

FIG. 1 illustrates a typical POS terminal 100 adapted for use in conjunction with the present invention as described further below. A base unit 110 includes a microprocessor 111, memory 112 and a communications adapter 113. The POS terminal 100 communicates with other computers via the communications adapter 113 via a local area network connection 150. Peripheral input and output devices are connected to the base unit 110 including an operator keyboard 121, an operator display 123, a cash drawer 120, and a receipt printer 122 for printing paper receipts. A magnetic stripe card reader 124 may also be connected for credit card transactions. A PIN pad 125 may also be attached to allow a consumer to enter a Personal Identification Number (PIN) authorizing data to be read from a magnetic stripe card or a smart card 131. The PIN pad 125 may be alternately used to allow a consumer to enter a Personal Identification Number (PIN) for use in conjunction with debit card transactions. A smart card reader/writer 130 is optionally attached to the base unit in an embodiment of the invention that uses a smart card 131 as the portable medium.

The POS terminal 100 is adapted for use in conjunction with the present invention by storing software in the memory 112 of the POS terminal that performs the routine required to generate the detailed transaction record illustrated in FIG. 6 and described further below.

Figure 2:
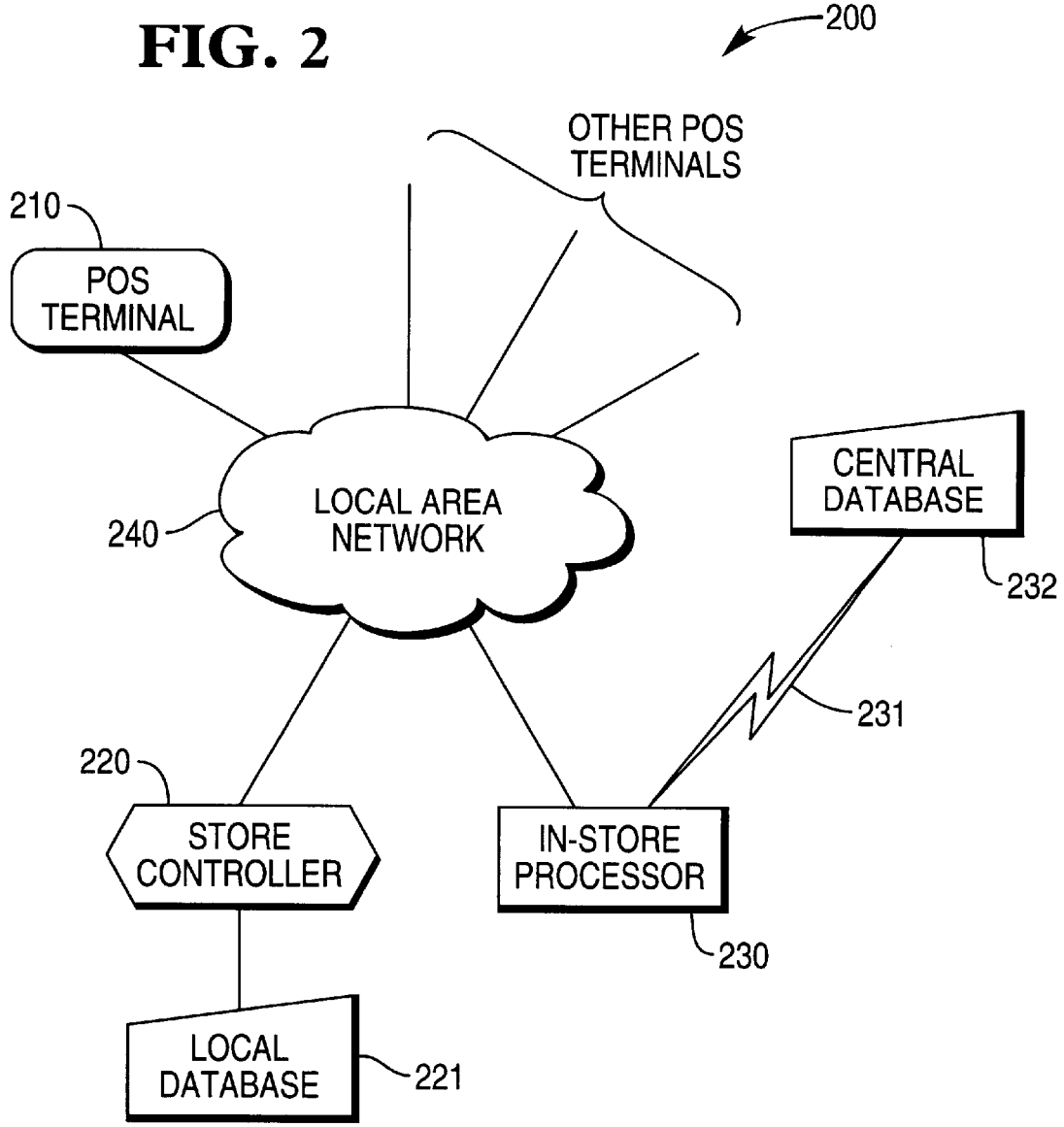
FIG. 2 illustrates a POS store system for implementing one embodiment of the present invention.

FIG. 2 illustrates a POS system 200, including one or more POS terminals 210 and one or more store controllers 220 that provide price data to the POS terminals 210 and retain a local database 221 of past transactions. The system optionally includes an in-store processor (ISP) 230, a separate computer dedicated to managing a communications link 231 with a central database facility 232 as well as performing other store operations. The POS terminals 210, the store controllers 220 and the in-store processor 230 each have communications adapters such as the communications adapter 113 in FIG. 1 and are connected via a local area network 240.

Figure 3:
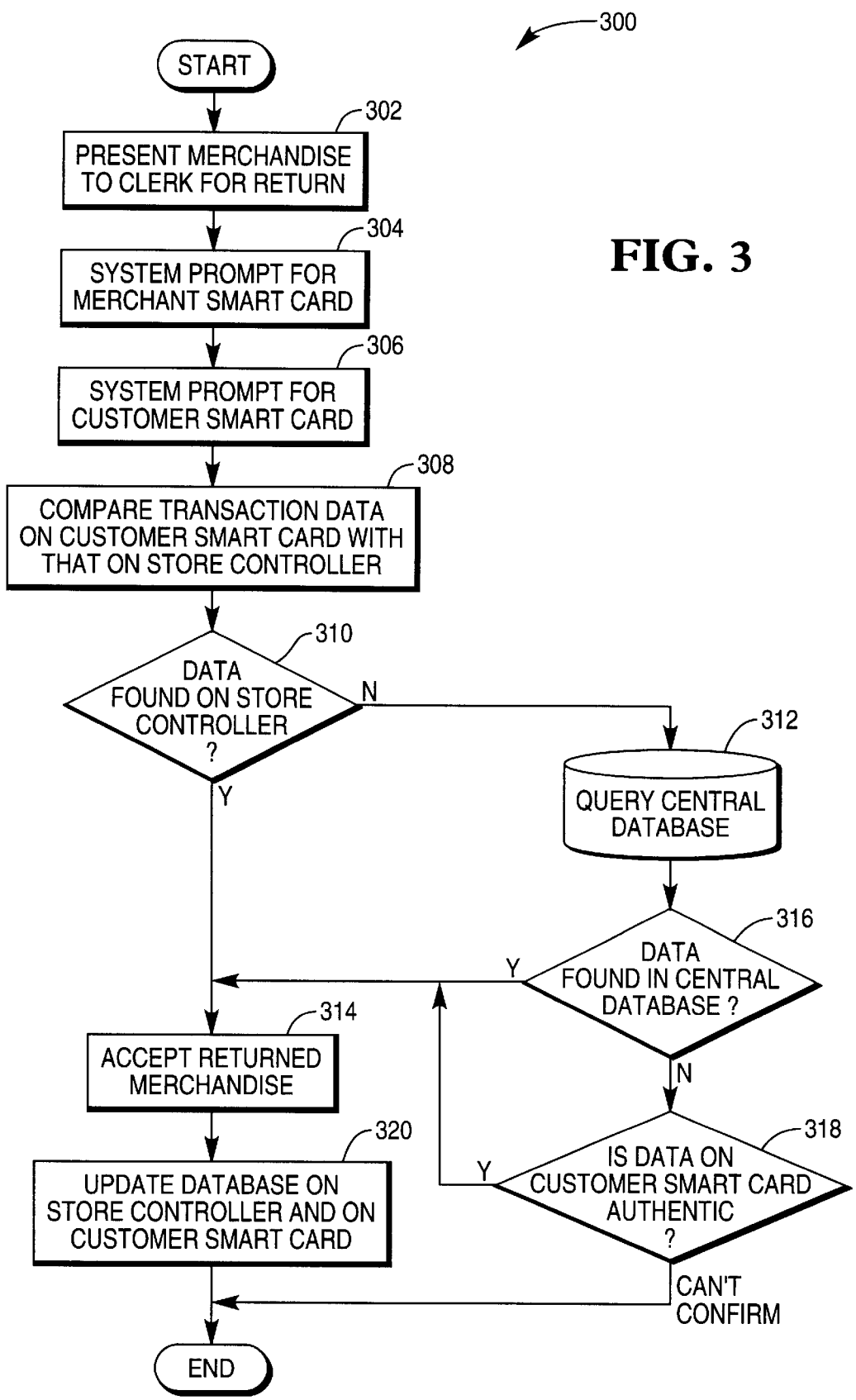
FIG. 3 illustrates a flow chart of a merchandise return procedure in accordance with the present invention.

FIG. 3 illustrates a procedure 300 for processing returned merchandise. At process step 302, a customer presents merchandise to a store clerk at a POS terminal such as the POS terminal 100 in FIG. 1. The store clerk initiates a return query on the POS system and is prompted by the application software at step 304 to insert the merchant smart card into a smart card reader/writer. Alternatively, the merchant smart card data can reside in the POS system software obviating the need for step 304. At step 306, the POS system software prompts the customer to insert his smart card into a smart card reader/writer such as the smart card reader/writer 130 in FIG. 1. At step 308, the POS system software validates the authenticity of the original purchase transaction by comparing the data on the customer smart card to the corresponding data record on a store controller such as the store controller 220 in FIG. 2. If the transaction data record was found on the store controller at step 308, step 310 allows the POS system software to proceed to step 314 and the return is processed and a return or refund transaction receipt is generated for the customer. At step 320, the return or refund transaction record is written to both the customer smart card and the store transaction database on the store controller.

If a corresponding data record is not found on the store controller at step 308, step 310 allows the POS system software to proceed to step 312. At step 312, the POS system software queries a central database facility for the transaction data. This central database facility is typically remotely located as illustrated by the central database facility 232 in FIG. 2. At step 316, the POS system software determines if the transaction data was found in the central database facility. If the data was found, the POS system software proceeds to step 314. If the transaction data record was not found on the central database facility at step 316, the POS system software proceeds to step 318 to confirm the authenticity of the data on the customer smart card. If the data on the smart card is authenticated, the store clerk is authorized to accept the returned merchandise and process a refund. This approach provides a substantial improvement over a manual process that relies upon the clerk to determine if the paper receipt is valid and that often involves a time consuming approval procedure by the clerk's supervisor.

Figure 3A:
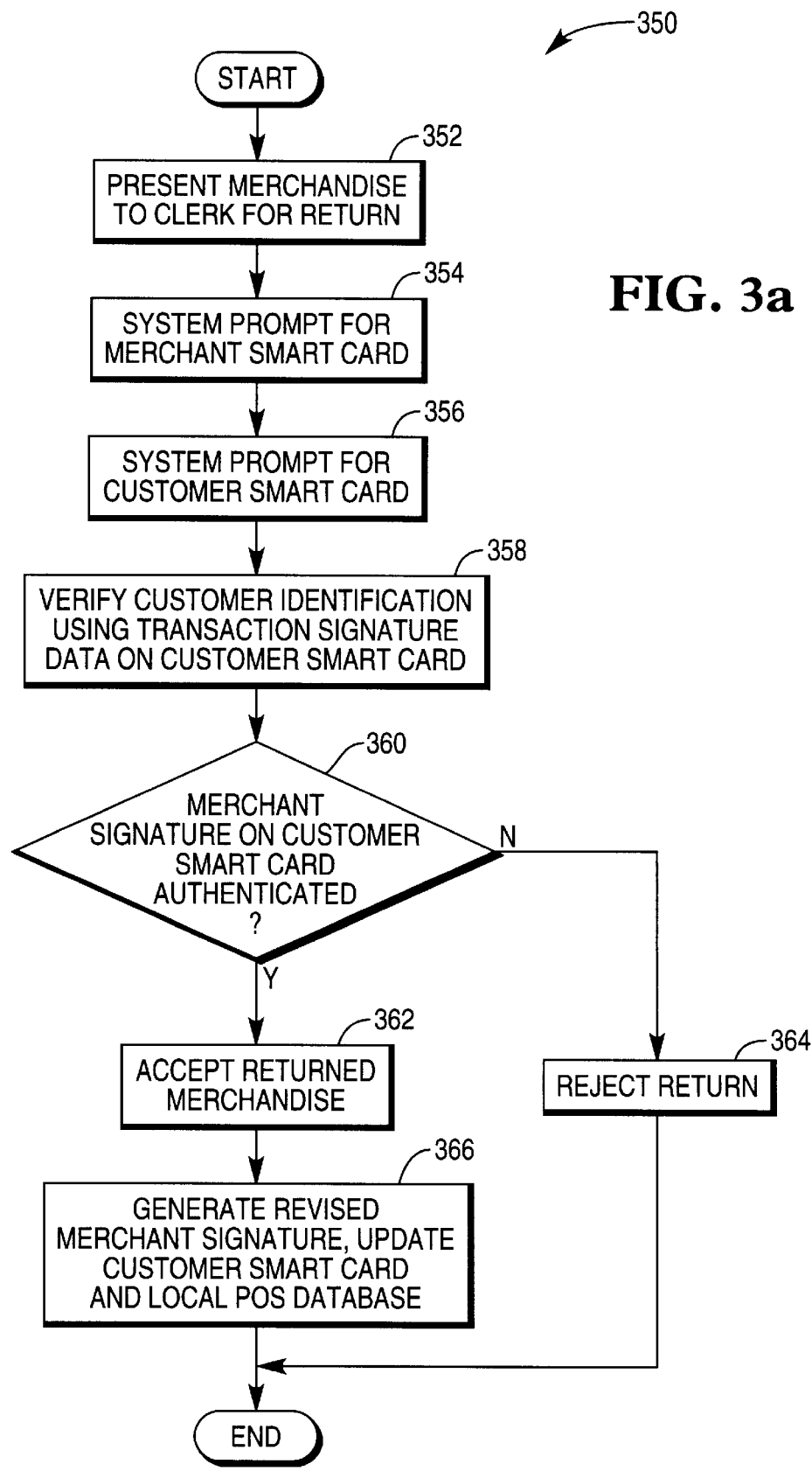
FIG. 3a illustrates an alternative merchandise return procedure in accordance with another embodiment of the present invention.

FIG. 3a illustrates a procedure 350 for processing returned merchandise using the data contained on a customer smart card and merchant smart card only. At process step 352, a customer presents merchandise to a store clerk at a POS terminal such as the POS terminal 100 in FIG. 1. The store clerk initiates a return query on the POS system and is prompted by the application software at step 354 to insert the merchant smart card into a smart card reader/writer attached to the POS terminal. In an alternate embodiment, the merchant smart card may be semi-permanently inserted in a smart card reader/writer that is not readily accessible by the store clerk. This could be accomplished by having a dedicated smart card reader/writer secured in a wrap stand under the POS terminal or elsewhere in the store. In another alternate embodiment, the merchant smart card data can be an integral component of the POS system software. Either of these alternate embodiments would obviate the need for step 354. At step 356, the POS system software prompts the customer to insert their smart card into a smart card reader/writer such as the smart card reader/writer 130 in FIG. 1. At step 358, the POS system software prompts the store clerk to validate the identification of the customer utilizing the customer ID data on the customer smart card. The identification of the customer may be accomplished in a number of ways. For example, the customer may be asked to enter a PIN number on a PIN pad, to confirm some piece of personal information that is stored on the smart card, or a digital photograph of the customer stored on the smart card can be displayed on the POS operator display so that the customer can be visually identified. The POS system software then proceeds to step 360 to verify the authenticity of the relevant transaction data corresponding to the returned merchandise. Process step 360 attempts to reconstruct the merchant signature utilizing the merchant key and the transaction data on the customer smart card. If the merchant signature does not match, the process proceeds to step 364 which prompts the store clerk to reject the returned merchandise. If the merchant signature does match, the relevant transaction data is authenticated and the system proceeds to step 362 which prompts the store clerk to accept the returned merchandise. At step 366, the returned merchandise is removed from the transaction record and a revised merchant signature is generated that reflects the current contents of the relevant transaction data. The customer smart card data is also updated as is the local POS database. This approach is an improvement over a manual process that relies upon the validity of the paper receipt and the clerk's determination of such validity only.

Figure 4:
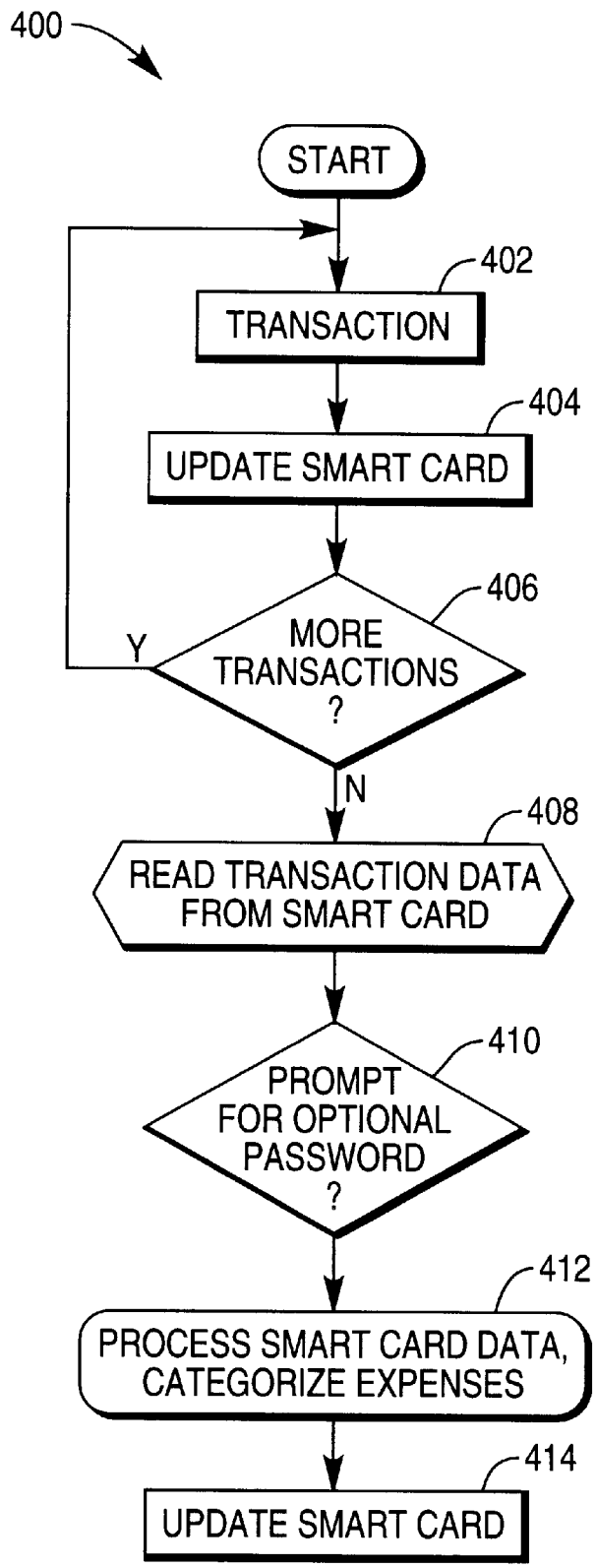
FIG. 4 illustrates a flow chart of a business expense accounting procedure in accordance with the present invention.

FIG. 4 illustrates a process 400 whereby a business traveler or other consumer purchases a series of goods and services in the course of a business or shopping trip. At step 402, the purchaser completes a transaction that includes the use of a smart card such as the smart card 131 in FIG. 1. A data record of the transaction is written to the purchaser's smart card at step 404. If the purchaser has no more purchases to make, step 406 causes the process to proceed to step 408. Otherwise, steps 402 and 404 repeat as more purchases are made. At the end of the trip, the consumer inserts the smart card into a smart card reader attached to a personal computer such as the smart card reader/writer 130 in FIG. 1. The transaction data on the smart card is read at step 408. The consumer is then prompted to provide an optional password at step 410 allowing the data on the smart card to be accessed. In the example where the consumer is a business traveler, process step 412 would prompt the consumer to select and verify the appropriate data transaction records to be sent to the expense accounting department for reimbursement. In the example where the consumer is a shopper, process step 412 would prompt the consumer to select and categorize data records by transaction type or other parameters. At step 414, the smart card is updated to indicate those data records that have been read. The data records that have been read may alternately be deleted from the smart card.

Figure 5:
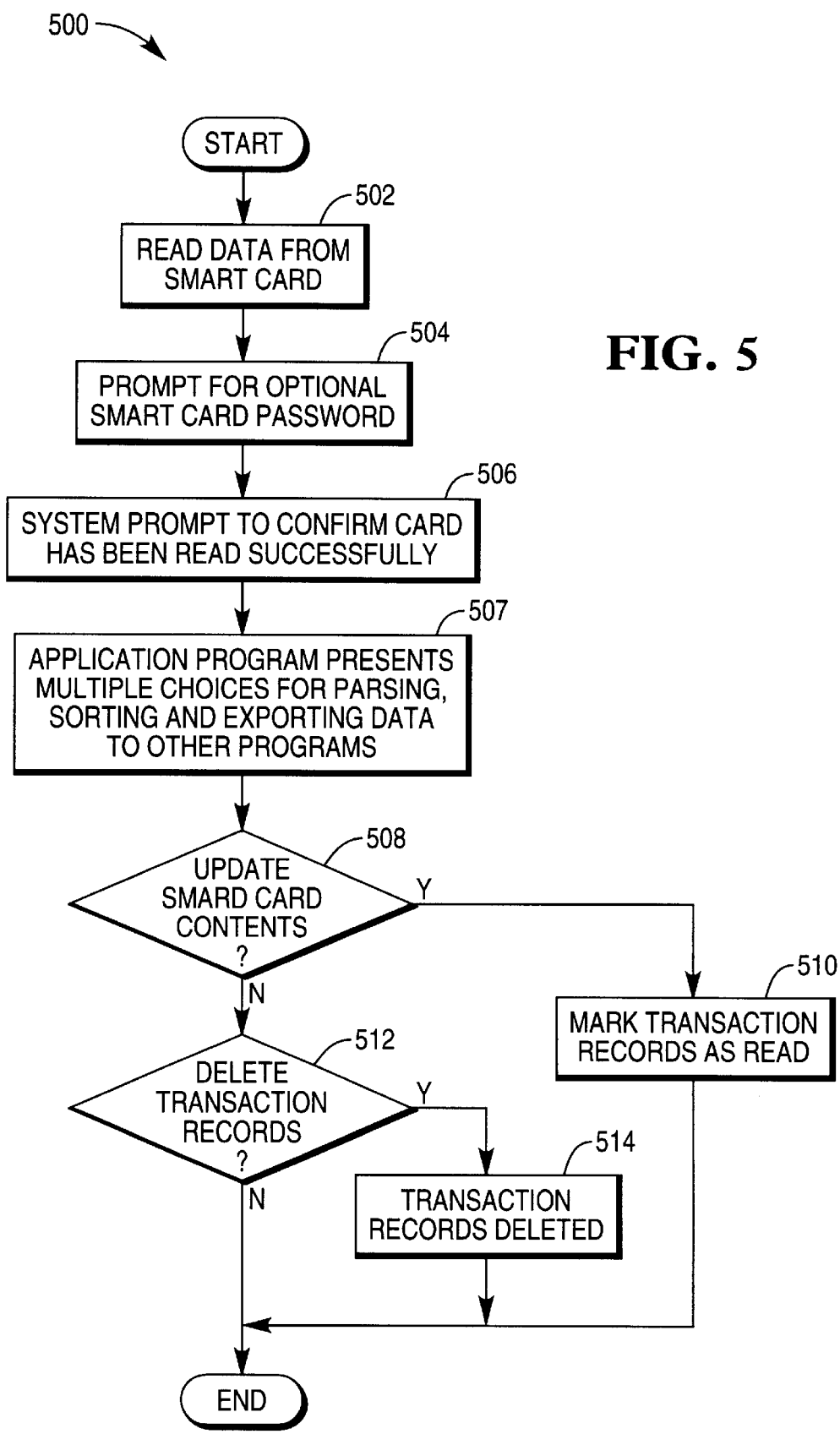
FIG. 5 illustrates a procedure for importing and parsing consumer data in accordance with the present invention.

FIG. 5 illustrates a process 500 whereby the transaction data records stored on a smart card are processed by an application program running on a personal computer. The transaction data records are read from the smart card at step 502 by a smart card reader/writer attached to a personal computer such as the smart card reader/writer 130 in FIG. 1. The application program may prompt the user for an optional password at step 504 before allowing the smart card data to be imported into the personal computer program. At step 506, the user is prompted to confirm that the data has been read properly before the data is manipulated by the program. At step 507, the user is presented with a number of choices for manipulating the data. The program may parse and sort the data based upon various parameters chosen by the user. Examples of such parameters are the product descriptions, the merchant ID or the merchant category (restaurant, hardware store, etc.). The program could allow the user to re-categorize the data as the user sees fit. The sorted data could then be exported to other computer programs, such as a personal financial program, for further processing.

The user is prompted at step 508 to choose whether the smart card data should be updated by flagging those records that were read in step 506. If the user chooses to update the records on the smart card, the process proceeds to step 510 and the transaction data records are marked as having been read. If the user chooses to not mark the records as having been read, the process prompts the user to choose whether to delete the records from the smart card at step 512. If the user chooses to delete the data records, the process proceeds to step 514 and deletes the transaction data records from the smart card and the process ends. If the user chooses not to delete the transaction data records, the process ends.

FIG. 6 illustrates a detailed transaction data record 600. In a preferred embodiment of the invention, a detailed transaction record or receipt is generated. A transaction record is a generic term used herein to describe a variety of types of records of various transactions for services or retail goods. Receipts generally refer to the paper transaction records created by the sale of goods or services in retail commerce. The detailed transaction record 600 may suitably include, but is not limited to, a merchant ID 601, customer ID 611, the date of the transaction 620, the time of the transaction 630, a list of the goods or services sold 670–675, a transaction amount total 640, tender type 641, a merchant signature 650 and an optional customer signature 660. The merchant identifier is a number unique to a specific merchant and/or merchant location. The list of goods or services will include price information and may include specific product identification information such as Universal Product Code (UPC), a merchant's proprietary stock keeping unit number (SKU), a merchant's proprietary price look-up (PLU) number, European Article Number (EAN), alphanumeric product descriptors, or the like.

The merchant ID 601 and the merchant key 602 are numbers or alphanumeric designations that can be unique to a specific merchant or a specific merchant location. The customer ID 611 and the customer key 612 are numbers or alphanumeric designations that can be unique to a specific consumer or consumer group such as employees of a specific company.

The merchant signature 650 is preferably generated by encrypting the data contained in the transaction record and a merchant key 602. The merchant ID 601 and merchant key 602 can be contained in the memory of a merchant's smart card 600, in the memory of a merchant's POS system, supplied by a clerk during the transaction, or some combination of the above. For example:

Merchant Signature 650=Encrypt {(601,611,620,630,640, 641),602}

The optional customer signature 660 is generated by encrypting the data contained in the transaction record and a customer key 612. The customer ID 611 and customer key 612 can be contained in the memory of a customer's smart card 610, supplied by the customer during the transaction via a PIN pad or other mechanism, or some combination of the above. For example:

Customer Signature 660=Encrypt {(601,611,620,630, 640,641),612}

In the preferred embodiment the generation of the merchant signature 650 involves two secure media, a merchant's smart card and a customer's smart card. The merchant smart card contains the merchant ID 601, the merchant key 602, and the processing steps or algorithm to authenticate the customer smart card and create the merchant signature 650. The customer smart card contains the customer ID 611, the customer key 612, and the processing steps or algorithm to authenticate the merchant smart card and create the optional customer signature 660.

In another embodiment, of the invention a second merchant signature 690 is generated from the first merchant signature 650 and a key is derived from the data of each transaction such as the customer ID and the merchant key. For example:

Transaction Session Key 680=Encrypt {611,602}

Merchant Signature 690={650-Encrypt (611,620,630, 640,641,680)}

Symmetric encryption may be used to create merchant signature 650, customer signature 660, transaction session key 680 and second merchant signature 690. This would allow the merchant to verify any of these signatures with the same keyspace. Alternately, asymmetric encryption could be used to create these signatures. This would allow the merchant to publish the key used to verify the signatures for use within a given retail chain establishment or by others. For instance, a merchant could provide another company its key such that this other company could verify transaction records. This approach could be useful in the system illustrated above in FIG. 4.

Figure 7A:
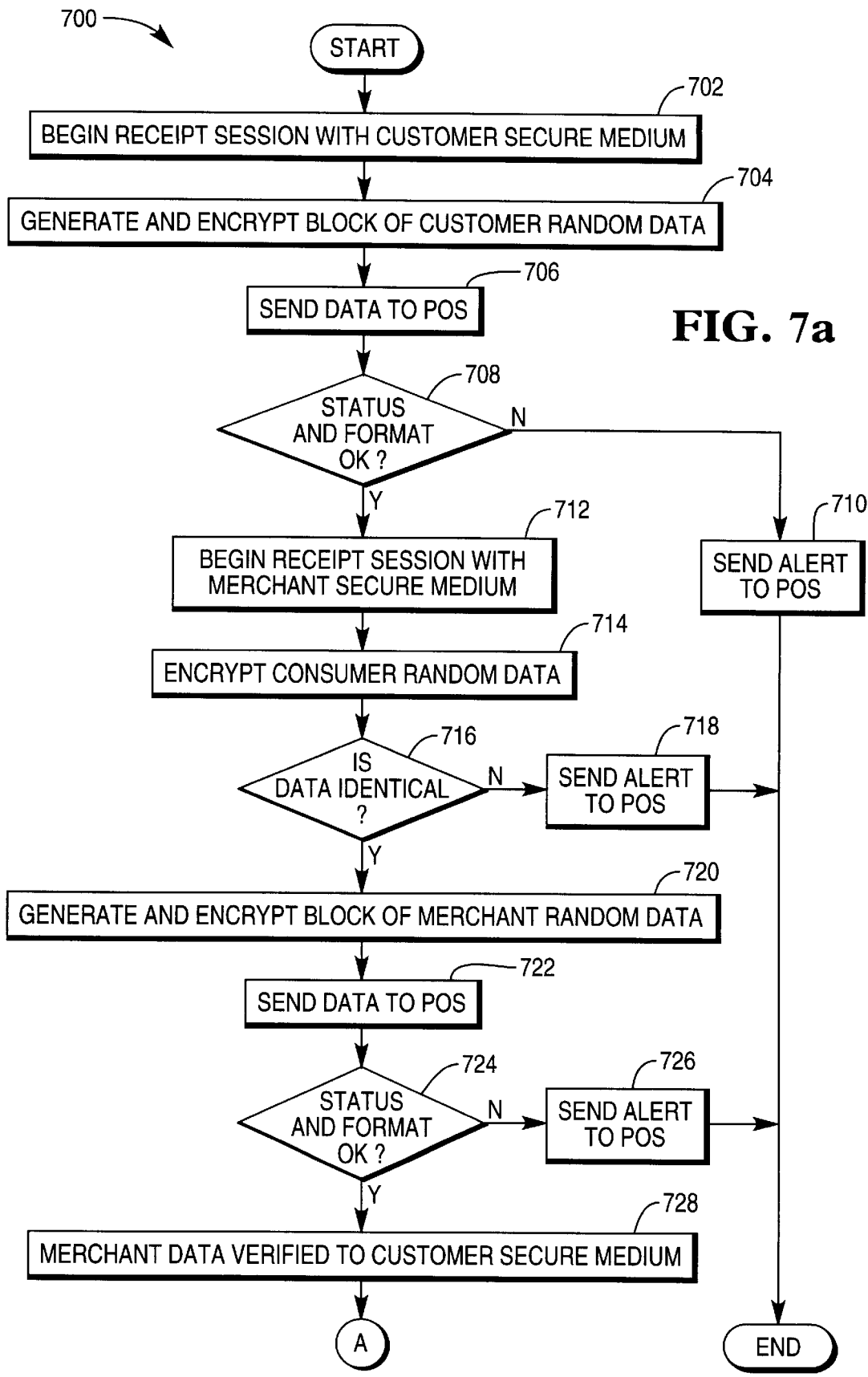
FIGS. 7a and 7b illustrate the interchange of data between a merchant secure medium, a customer secure medium and a POS terminal in accordance with the present invention.
Figure 7B:
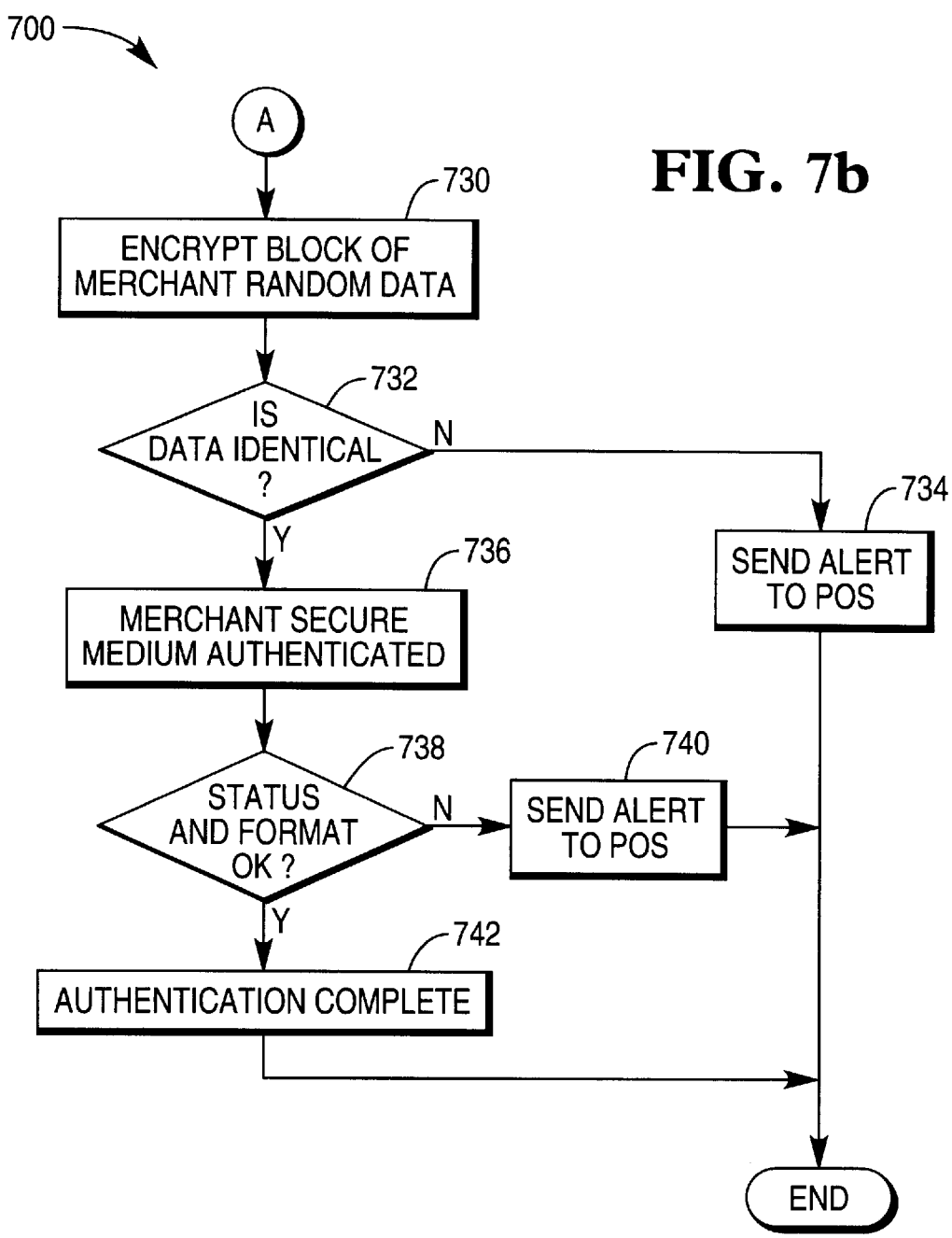

FIGS. 7a and 7b illustrate a process 700. The process 700 illustrates the interchange of data between the merchant secure medium, the customer secure medium and the POS terminal. Both the merchant secure medium and the customer secure medium may be smart cards. Process 700 is used to authenticate the merchant secure medium to the customer secure medium. Additionally, this process is used to authenticate the customer secure medium to the merchant secure medium. Some of these authentication processes may be optional based on the level of security desired. The process begins at process step 702, when a POS terminal such as the POS terminal 100 in FIG. 1 sends a command to a customer secure medium such as the smart card 131 in FIG. 1, beginning the receipt session. This command could contain a series of parameters that select an appropriate random number generator, an appropriate encryption algorithm and appropriate key for this particular receipt session. At step 704, the customer secure medium generates a block of customer random data and encrypts the block of customer random data with the selected key and algorithm. Both the customer random data and the encrypted customer random data are stored in the customer secure medium. At step 706, the customer secure medium sends data to the POS terminal consisting of a command status indicator, the customer identifier (ID), the block of customer random data, and the encrypted block of customer random data. At step 708, the POS terminal checks if the data from the customer secure medium contains the expected status and that the data is in the proper format. If both the status and format are correct, the process proceeds to step 712. Otherwise, the process branches to step 710 and an alert is sent to the POS terminal application indicating that the customer secure medium could not be authenticated. The POS terminal application may optionally be programmed to notify the operator that the customer secure medium is not loaded with the appropriate merchant application.

At step 712, the POS terminal sends a command to the merchant secure medium to begin a receipt session with the merchant secure medium. The block of customer random data and the block of encrypted customer random data are sent to the merchant secure medium with the command. This command could contain a series of parameters that select an appropriate random number generator, an appropriate encryption algorithm and an appropriate key for this particular receipt session. If a derived session key is desired, session specific information such as a date/time, session counter, or consumer ID could be included. At step 714, the merchant secure medium encrypts the block of customer random data and compares it to the block of encrypted customer random data. At step 716 the presented block of encrypted customer random data is compared to the computed block of encrypted customer random data. If the data is identical the process proceeds to step 720, otherwise the process branches to step 718 and the merchant secure medium sends an alert to the POS terminal indicating that the customer secure medium data was not authenticated.

At step 720, the merchant secure medium generates a block of merchant random data and encrypts the merchant random data. Both the merchant random data and the encrypted merchant random data are stored in the merchant secure medium. At step 722, the merchant secure medium sends data to the POS terminal consisting of a command status indicator, the merchant identifier (ID), the block of merchant random data, and the encrypted block of merchant random data. At step 724, the POS terminal checks if the data from the merchant secure medium contains the expected status and that the data is in the proper format. If both the status and format are correct, the process proceeds to step 728. Otherwise, the process branches to step 726 and an alert is sent to the POS terminal application indicating that the customer secure medium does not contain the data required for the receipt session to continue. The POS terminal application may optionally be programmed to add the merchant's detailed receipt application to the customer secure medium. At step 728, the POS terminal application program sends a command to the customer secure medium that verifies the merchant data to the customer secure medium. The block of merchant random data and the block of encrypted merchant random data are included with the command. This command may contain a series of parameters that select an appropriate random number generator, an appropriate encryption algorithm and an appropriate key for this particular receipt session. If a derived session key is desired, session specific information such as a date/time, session counter, or merchant ID may be included. At step 730, the customer secure medium encrypts the block of merchant random data. At step 732, the presented block of encrypted merchant random data is compared to the computed block of encrypted merchant random data. If the data is identical, the process proceeds to step 736. Otherwise, the process branches to step 734 and the customer secure medium sends an alert to the POS terminal indicating that the merchant secure medium data was not authenticated. At step 736, the POS terminal application program checks if the data from the customer secure medium contains the expected status and that the data is in the proper format. If both the status and format are correct, the process proceeds to step 742. Otherwise, the process branches to step 740 and an alert is sent to the POS terminal application indicating that the customer secure medium failed to authenticate the merchant data. The POS terminal application may optionally be programmed to notify the operator that the merchant secure medium does not appear to contain the data necessary to continue the receipt application. The operator may then be instructed to ask the consumer if he would like to have the customer secure medium replaced or updated so that the merchant secure medium can be authenticated. If the process proceeds to step 742, the customer secure medium has been properly authenticated by the merchant secure medium and vice versa.

FIG. 8 illustrates a process 800 for generating the merchant signature and writing it to the customer secure medium. This process allows the customer secure medium to verify the authenticity of a detailed transaction receipt to a merchant secure medium in conjunction with the present invention. At step 802, a POS terminal such as the POS terminal 100 of FIG. 1 sends a 'Present Transaction Data' command to the merchant secure medium. This command instructs the merchant secure medium to send the data from the current retail transaction and includes specific data elements that are unique to a given retail transaction. These data elements may include the merchant identifier (ID), the customer ID, the transaction date, the transaction time, the transaction total, and the tender type. At step 804, the merchant secure medium encrypts the data elements from the current transaction with a merchant signature key, generating the merchant signature. At step 806, the merchant secure medium sends the merchant signature to the POS terminal. At step 808, the POS terminal application program formats the detailed transaction data record, or detailed receipt, such as the data record of FIG. 6, to include the merchant signature. At step 810, the POS terminal sends a 'Write Detailed Receipt' command to the merchant secure medium instructing the merchant secure medium to write a signed detailed transaction record to the customer secure medium. The 'Write Detailed Receipt' command includes the detailed transaction data record. The customer secure medium might require additional security steps before data may be written. Such steps may include the requirement of password verification and customer key presentation before the write command may be sent. For some secure medium, the writing of a detailed transaction record may require a series of individual write commands for each data element rather than a single command. In addition, secure message authentication codes may be required. At step 812, the transaction data record is written to the customer secure medium. The customer secure medium then sends a message to the POS terminal indicating whether the write operation was successful.

Figure 8A:
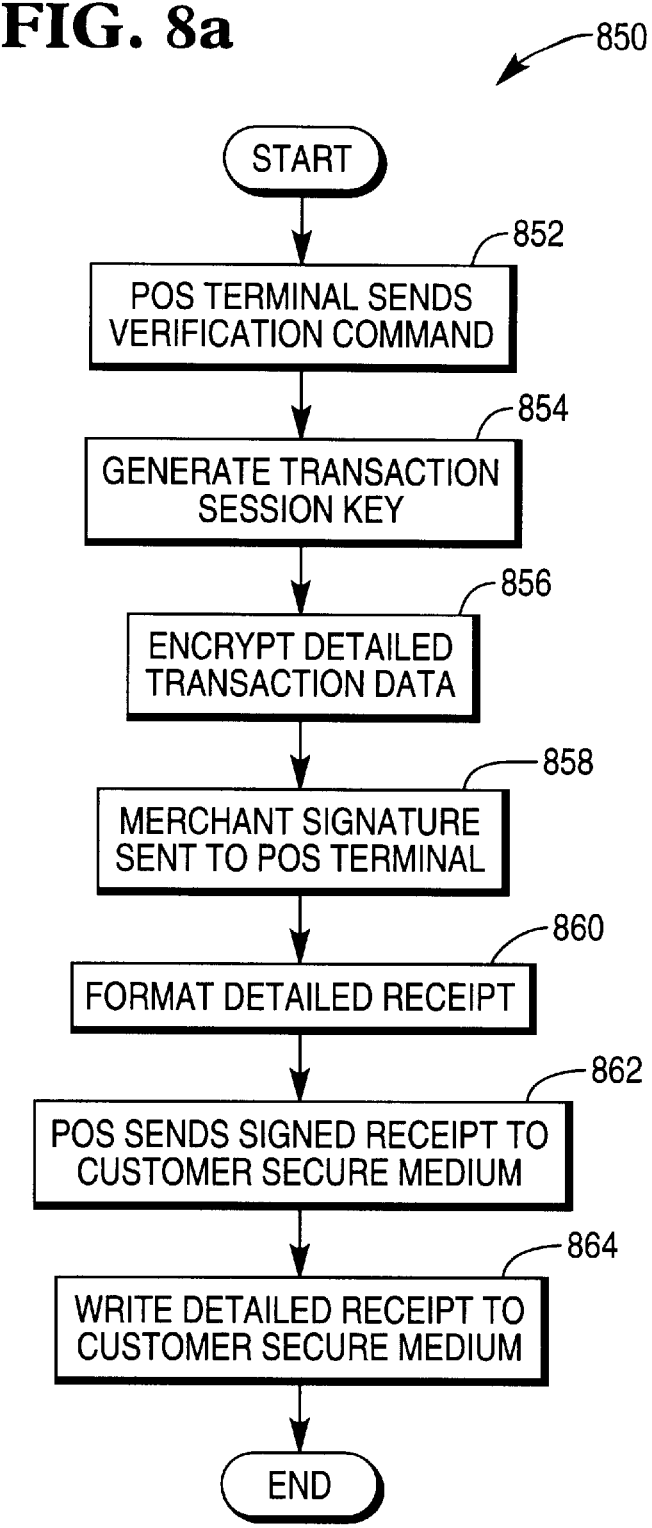
FIG. 8a illustrates an alternate method for generating a merchant signature in accordance with the present invention.

FIG. 8a illustrates a process 850, an alternate process for generating the merchant signature and writing it to the customer secure medium. This process adds a transaction key that is specific to each transaction. At step 852, a POS terminal such as the POS terminal 100 of FIG. 1 sends a 'Present Transaction Data' command to the merchant secure medium. This command instructs the merchant secure medium to send the data from the current retail transaction and includes specific data elements that are unique to a given retail transaction. These data elements may include the merchant identifier (ID), the customer ID, the transaction date, the transaction time, the transaction total, and the tender type. At step 854, the merchant secure medium generates a transaction session key by encrypting the customer ID with the merchant signature key. At step 856, the merchant secure medium generates the merchant signature by encrypting the data elements from the current transaction with the transaction session key. At step 858, the merchant secure medium sends the merchant signature to the POS terminal. At step 860, the POS terminal application program formats the detailed transaction data record, or detailed receipt, such as the data record of FIG. 6, to include the merchant signature. At step 862, the POS terminal sends a 'Write Detailed Receipt' command to the merchant secure medium instructing the merchant secure medium to write a signed detailed transaction record to the customer secure medium. The 'Write Detailed Receipt' command includes the detailed transaction data record. The customer secure medium might require additional security steps before data may be written. Such steps may include the requirement of password verification and customer key presentation before the write command may be sent. For some secure medium, the writing of a detailed transaction record may require a series of individual write commands for each data element rather than a single command. In addition, secure message authentication codes may be required. At step 864, the transaction data record is written to the customer secure medium. The customer secure medium then sends a message to the POS terminal indicating whether the write operation was successful.

Figure 9:
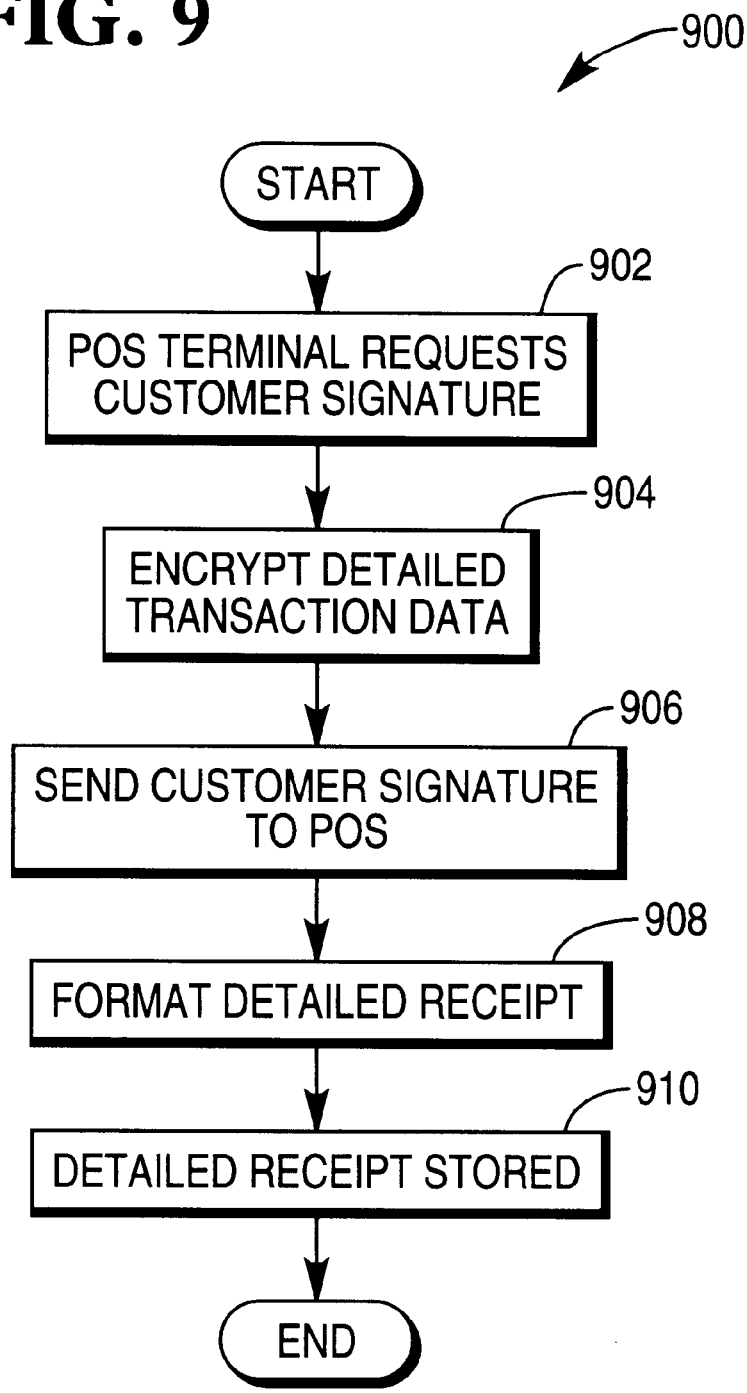
FIG. 9 illustrates a method for generating an optional customer signature in accordance with the present invention.

FIG. 9 illustrates a process 900, a process for generating an optional customer signature and writing it to the customer secure medium and a POS database. This customer signature allows a merchant to verify the validity of a customer retail transaction and adds an additional layer of authenticity to the related transaction data. At step 902, the POS terminal sends a 'Request Customer Signature' command to the customer secure medium. This command instructs the customer secure medium to generate a customer signature and send it to the POS terminal. At step 904, the customer secure medium encrypts the detailed transaction data with a customer signature key, generating the customer signature. The customer signature key may be derived utilizing a master merchant key, thus allowing signatures to be verified against an individual customer. In addition, session specific keys may be generated utilizing a transaction session key as described above in process 800. At step 906, the customer secure medium sends the customer signature to the POS terminal. At step 908, the POS terminal application program formats the detailed transaction data record, or detailed receipt, such as the data record of FIG. 6, to include the customer signature. At step 910, the POS terminal writes the detailed receipt with the imbedded customer signature to a POS database such as the local database 221 in FIG. 2.

Figure 10:
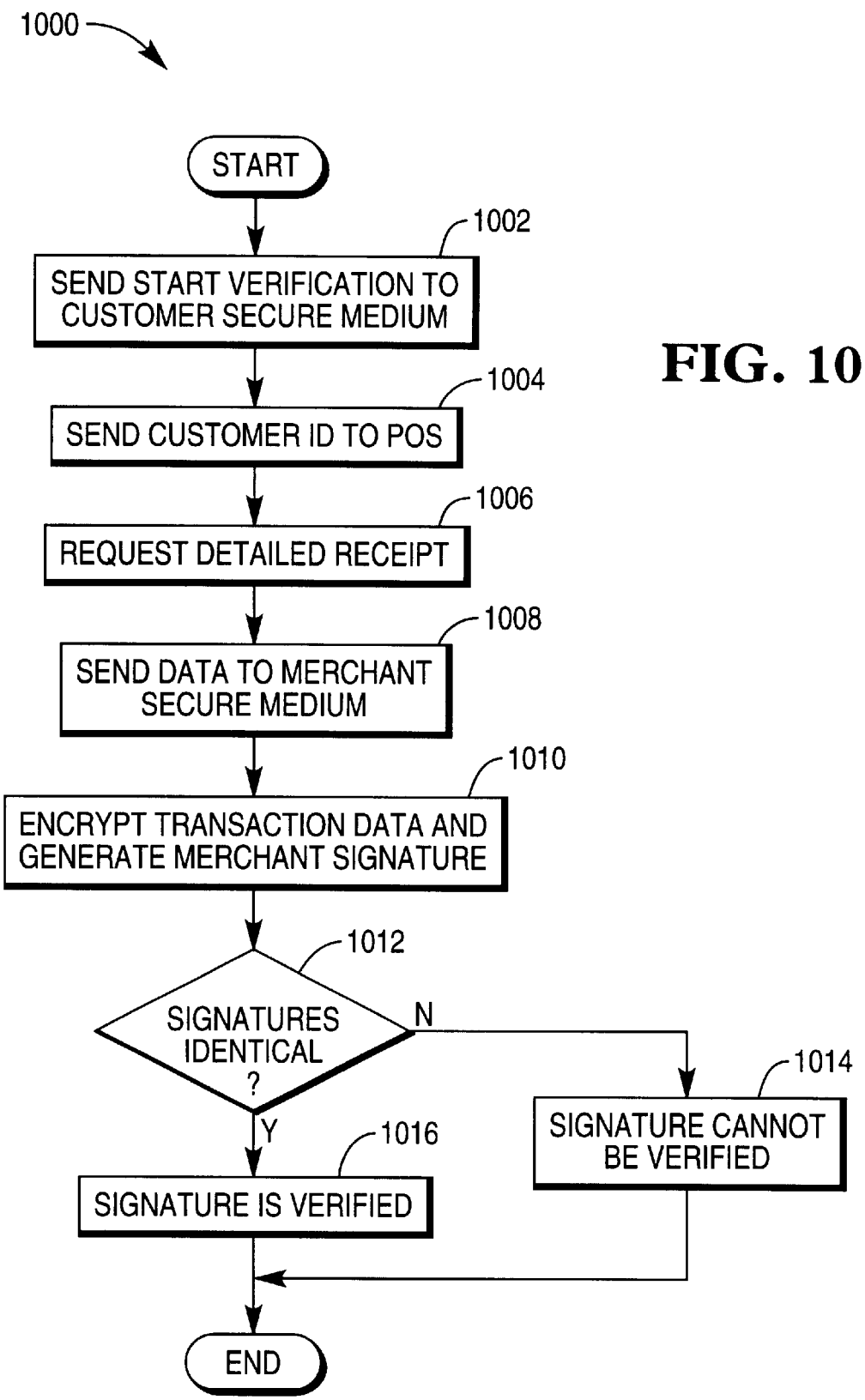
FIG. 10 illustrates a method for verifying a merchant signature stored on a customer secure medium in accordance with the present invention.

FIG. 10 illustrates a process 1000, a process for verifying a merchant signature stored on a customer secure medium. The process can also be used to verify a merchant signature that is stored in a POS database. This verification process is used to check the validity of a customer receipt when a customer presents merchandise to be returned to the merchant. At step 1002, the POS terminal sends 'Start Verification' command to the customer secure medium. This command instructs the customer secure medium to send the customer ID to the POS terminal, which is received at step 1004. At step 1006, a 'Request Detailed Receipt' command is sent to the customer secure medium. The customer secure medium responds to this command by sending the relevant detailed transaction data receipt to the POS terminal. At step 1008, the POS terminal sends a 'Verify Detailed Receipt' command to the merchant secure medium. This command instructs the merchant secure medium to verify the detailed transaction data from the secure customer medium. The merchant secure medium encrypts the transaction data with the merchant signature key at step 1010. This encryption step generates a computed merchant signature that is then compared at step 1012 to the merchant signature from the transaction data. If the merchant signatures do not match, the process branches to step 1014, and the merchant secure medium sends a command to the POS terminal indicating that the receipt data from the customer secure medium could not be verified as being valid. If the signatures do match, the process proceeds to step 1016, and the merchant secure medium sends a command to the POS terminal indicating that the receipt on the customer secure medium is valid.

Figure 11:
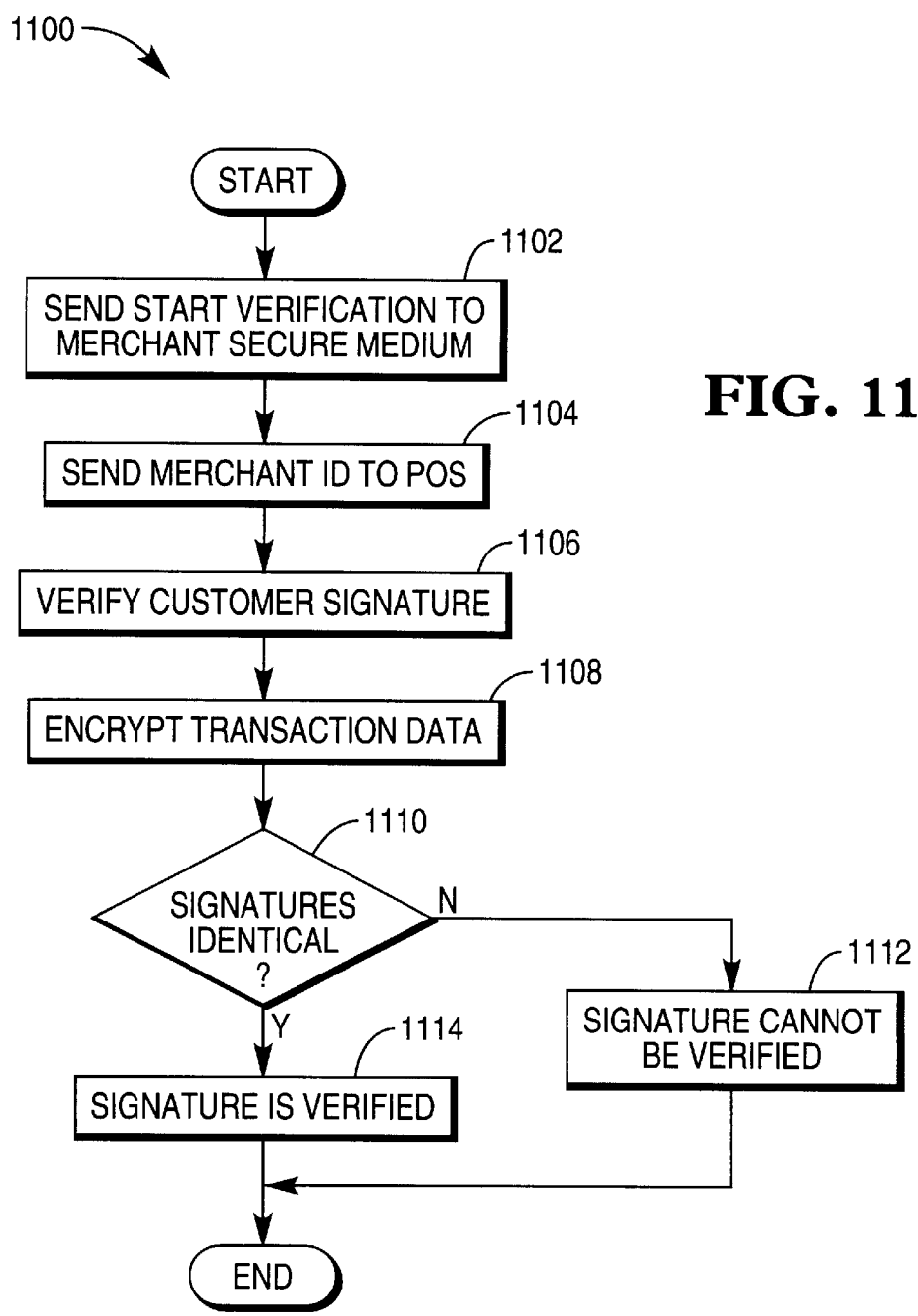
FIG. 11 illustrates a method for verifying a customer signature stored by a merchant on a POS database in accordance with one embodiment of the present invention.

FIG. 11 illustrates a process 1100, a process for verifying a customer signature stored by a merchant on a POS database such as the local database 221 in FIG. 2. The process can also be used to verify a merchant signature that is stored in a POS database. This verification process is used to check the validity of a transaction data receipt stored on a database. Utilizing this process would limit the ability of a merchant's employee to generate fraudulent receipts in the merchant's database. The process begins at step 1102 when the POS terminal sends a 'Start Verification' command to the merchant secure medium. At step 1104, the merchant secure medium sends the merchant ID to the POS terminal. At step 1106, the POS terminal sends a 'Verify Customer Signature' command and the relevant transaction data to the merchant secure medium. At step 1108, the merchant secure medium encrypts the detailed transaction data with the customer signature key, generating a computer customer signature. At step 1110, the merchant secure medium compares the computed consumer signature with the consumer signature from the database. If the customer signatures do not match, the process branches to step 1112, and the merchant secure medium sends a command to the POS terminal indicating that the receipt data from the database could not be verified as being valid. If the signatures do match, the process proceeds to step 1114, and the merchant secure medium sends a command to the POS terminal indicating that customer signature from the receipt on the database is valid.

I claim:

1. A method for creating authenticated electronic retail transaction receipts by generating a retail merchant's signature, the method comprising the steps of:

storing data in a computer memory, said data comprising a retail merchant identification number, retail customer identification number, and transaction data;

storing in a computer memory a merchant supplied signature key;

encrypting said data with the merchant supplied signature key to generate a merchant signature;

generating a record comprising said merchant signature and detailed transaction data; and storing the record on a point of sale (POS) system.

2. The method of claim 1 further comprising the step of writing a copy of the record into a memory on a portable customer secure medium thereby providing the retail customer with a verifiable copy of the retail transaction record.

3. The method of claim 2 wherein the portable customer secure medium is a smart card that a retail customer inserts into a smart card reader/writer, and further comprising the step of:

writing a copy of the record into a memory of a customer's smart card thereby providing the retail customer with a verifiable copy of the retail transaction record.

4. The method of claim 2 wherein the portable customer secure medium stores additional records, the method further comprising the steps of:

reading the records;

determining which of the records represents reimbursable business expenses; and transmitting the records associated with the reimbursable business expenses to an accounting system.

5. The method of claim 1 further comprising the step of appending a retail customer's signature in association with the record.

6. The method of claim 5 wherein the portable customer secure medium is a smart card that a retail customer inserts into a merchant's smart card reader/writer, and further comprising the step of:

writing a copy of the record into a memory of a customer's smart card thereby providing the retail customer with a verifiable copy of the retail transaction record.

7. A method for creating authenticated electronic retail transaction receipts by generating a retail merchant'signature, the method comprising the steps of:

storing data in a computer memory, said data comprising a retail merchant identification number, a retail customer identification number, and transaction data;

generating a transaction specific session key;

encrypting said data with the transaction specific session key to generate a merchant signature;

generating a record comprising said merchant signature and detailed transaction data; and storing the record on a point of sale (POS) system.

8. The method of claim 7 further comprising the step of writing a copy of the record into a memory on a portable customer secure medium thereby providing the retail customer with a verifiable copy of the retail transaction record.

9. The method of claim 8 wherein the portable customer secure medium is a smart card that a retail customer inserts into a smart card reader/writer, and further comprising the step of:

writing a copy of the record into a memory of a customer's smart card thereby providing the retail customer with a verifiable copy of the retail transaction record.

10. The method of claim 7 further comprising the steps of appending a retail customer's signature in association with the record.

11. A method for processing a returned retail purchase comprising the steps of:

reading retail transaction data from a memory of customer secure medium, said retail transaction data including a retail merchant identification number and a retail customer identification number;

reading a merchant signature associated with said retail transaction data from the memory of the customer secure medium;

reading a merchant signature key from a merchant secure medium;

encrypting said retail transaction data with the merchant signature key to generate a generated merchant signature; and comparing said merchant signature read from a customer secure medium to said generated merchant signature to the authenticity of said retail transaction data.

12. The method of claim 11 wherein the customer secure medium is a smart card that a retail customer inserts into a smart card reader/writer.

13. The method of claim 12 wherein the merchant secure medium is a smart card that a retail merchant inserts into a smart card reader/writer.

14. The method of claim 12 wherein the merchant secure medium is a record permanently stored in a memory of a merchant POS system.

15. A system for generating and storing verifiable electronic retail transaction receipts comprising:

a point of sale (POS) system including a plurality of POS terminals, said terminals comprising a microprocessor, a memory, an operator keyboard, an operator display, a cash drawer;

a store controller;

a computer program executed by the POS system for storing data in the memory comprising a retail merchant identification number, a retail customer identification number, and transaction data, said program for encrypting said data with a merchant supplied signature key to generate a merchant signature and generating a verifiable electronic retail transaction receipt comprising said merchant signature and detailed transaction data; and a customer secure medium and a merchant secure medium for storing said verifiable electronic retail transaction receipts.

16. The system of claim 15 wherein the POS system further comprises a smart card reader/writer and wherein the customer secure medium is a smart card that a retail customer inserts into said smart card reader/writer.

17. The system of claim 15 wherein the POS system further comprises a smart card reader/writer and wherein the merchant secure medium is a smart card that a retail merchant inserts into said smart card reader/writer.

18. A method for creating authenticated electronic retail transaction receipts by generating a retail merchant's signature, the method comprising the steps of:

storing data in a computer memory, said data comprising a retail record having at least one element related to a transaction;

storing in a computer memory a merchant supplied signature key;

encrypting said data with the merchant supplied signature key to generate a merchant signature;

generating a record comprising said merchant signature and detailed transaction data related to the transaction; and storing the record on a point of sale (POS) system.

19. The method of claim 18 further comprising the step of writing a copy of the record into a memory on a portable customer secure medium thereby providing the retail customer with a verifiable copy of the retail transaction record.

20. The method of claim 19 wherein the portable customer secure medium is a smart card that a retail customer inserts into a smart card reader/writer, and further comprising the step of:

writing a copy of the record into a memory of the customer's smart card thereby providing the retail customer with a verifiable copy of the retail transaction record.

21. The method of claim 18 further comprising the step of appending a retail customer's signature in association with the record.

22. The method of claim 21 wherein the portable customer secure medium is a smart card that a retail customer inserts into a merchant's smart card reader/writer, and further comprising the steps of:

writing a copy of the record into a memory of a customer's smart card thereby providing the retail customer with a verifiable copy of the retail transaction record.

* * * * *